United States Patent [19]
Fajac et al.

[11] Patent Number: 5,297,188
[45] Date of Patent: Mar. 22, 1994

[54] DEVICE FOR THE MARKING OF INFORMATION ELEMENTS

[75] Inventors: Claude Fajac, Paris; Fabienne Ohnet-Lombal, Videlles, both of France

[73] Assignee: General Electric CGR S.A., Issy Les Moulineaux, France

[21] Appl. No.: 913,922

[22] Filed: Jul. 17, 1992

[30] Foreign Application Priority Data

Jul. 19, 1991 [FR] France ................... 91 09187

[51] Int. Cl.$^5$ ............................................. H05G 1/28
[52] U.S. Cl. ..................................... 378/162; 378/165
[58] Field of Search ........................... 378/162–166

[56] References Cited

U.S. PATENT DOCUMENTS 4,127,774 11/1978 Gillen .................................. 378/165
4,426,723 7/1984 Rouse .................................. 378/165

*Primary Examiner*—Craig E. Church
*Attorney, Agent, or Firm*—Pollock, Vande Sande & Priddy

[57] ABSTRACT

An x-ray identification module includes a strip having recesses formed in opposite surfaces thereof. An opaque x-ray marker is received within one of the recesses, and a lateral strip portion is defined adjacent each recess. At least two suction cups are mounted to the lateral portion adjacent each recess, in non-overlying relationship to the marker-so as to avoid adding thickness to the strip in the area of the marker. The module is particularly useful for mammography.

5 Claims, 4 Drawing Sheets

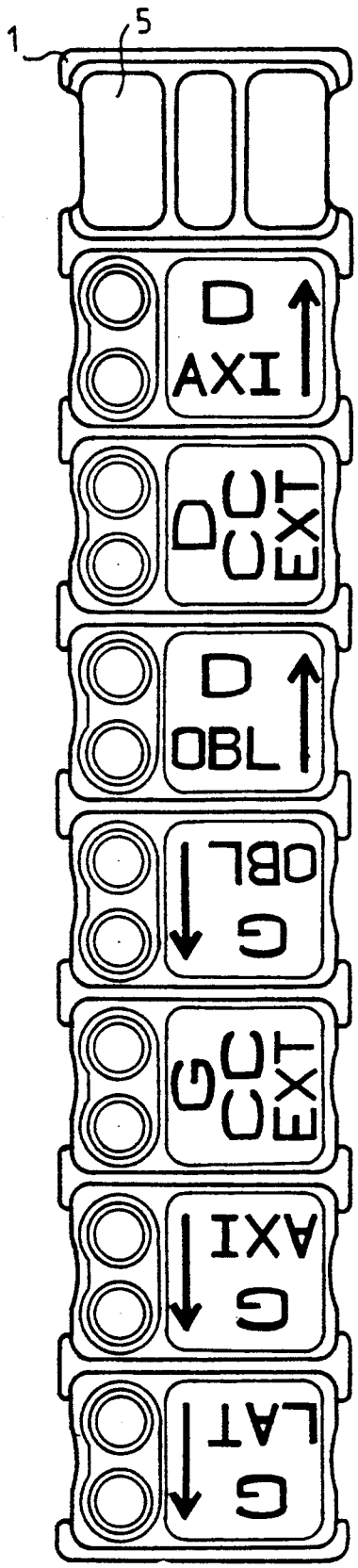
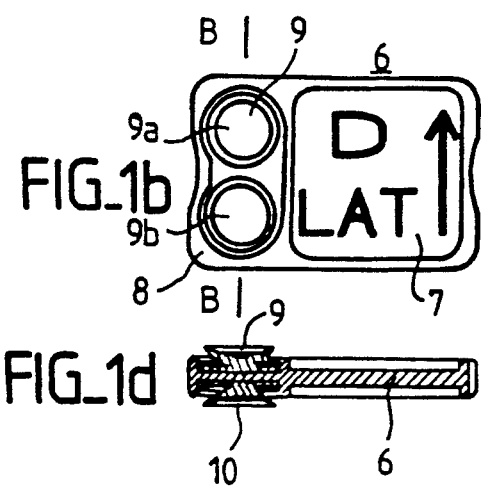
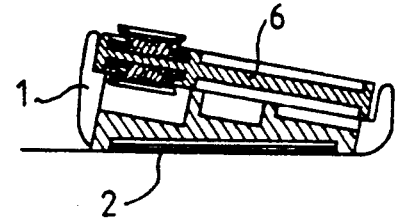
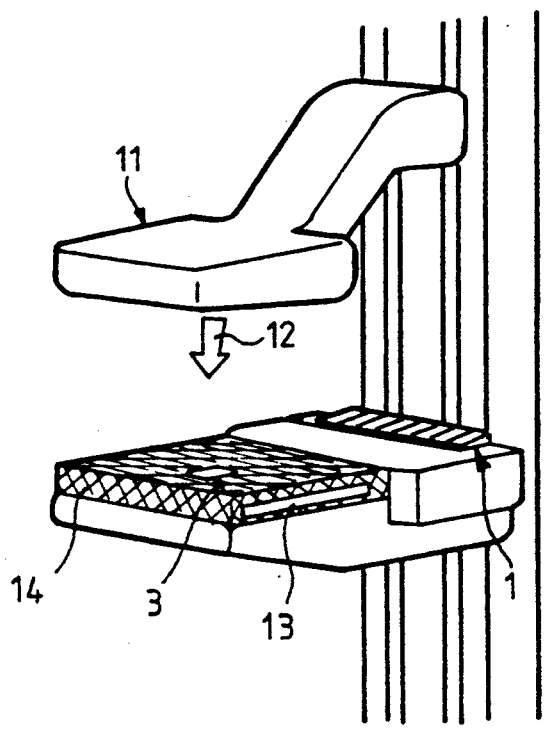

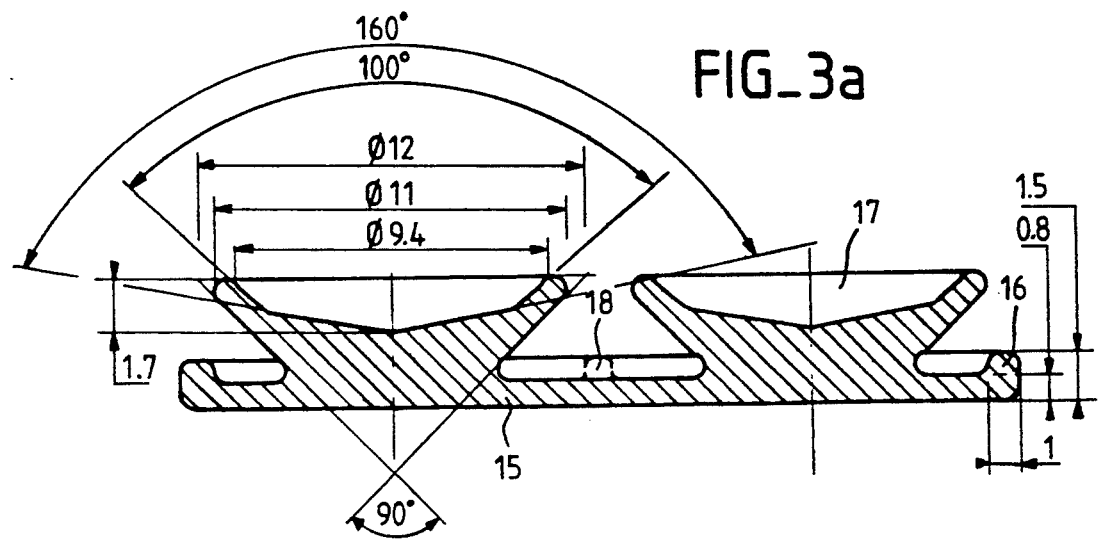
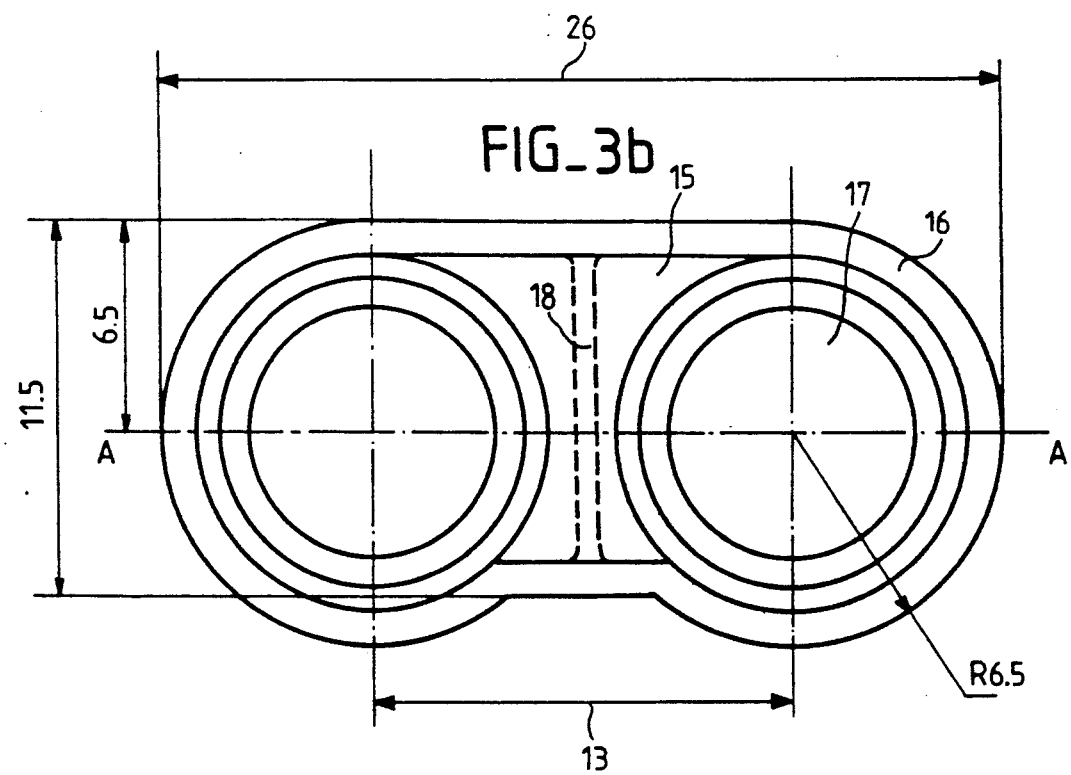

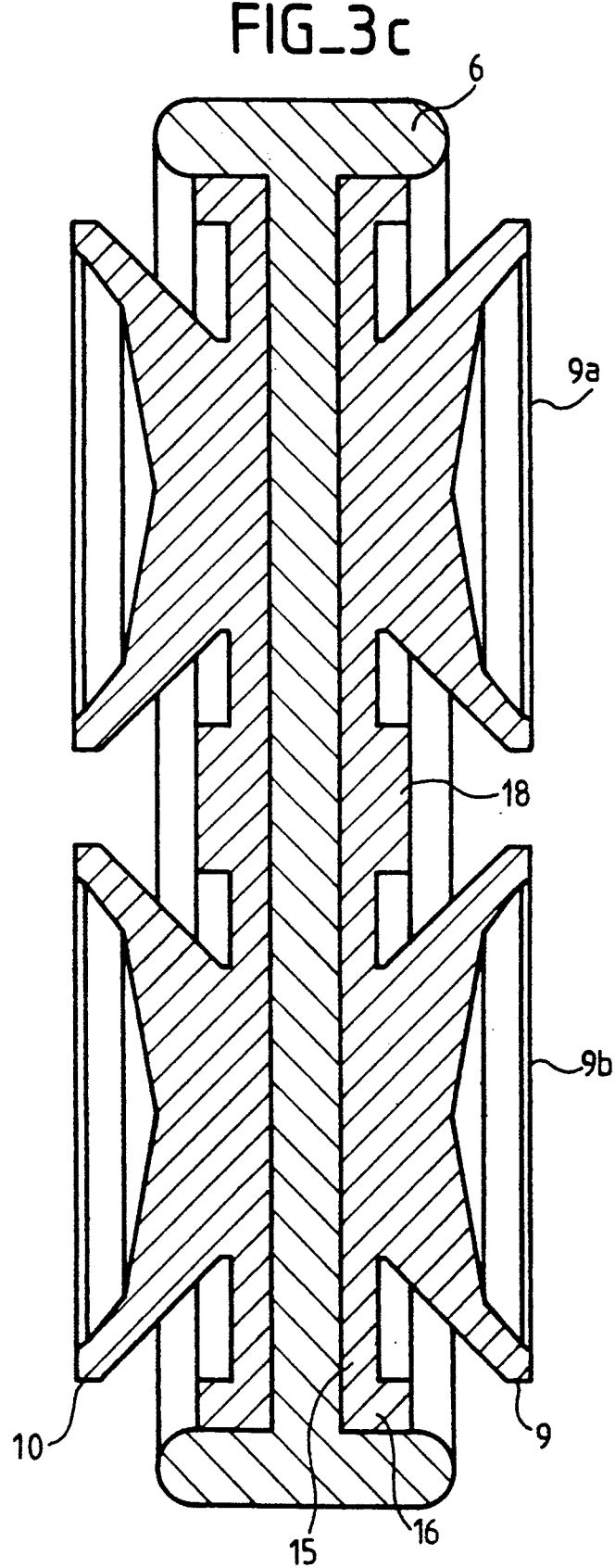

FIG_4
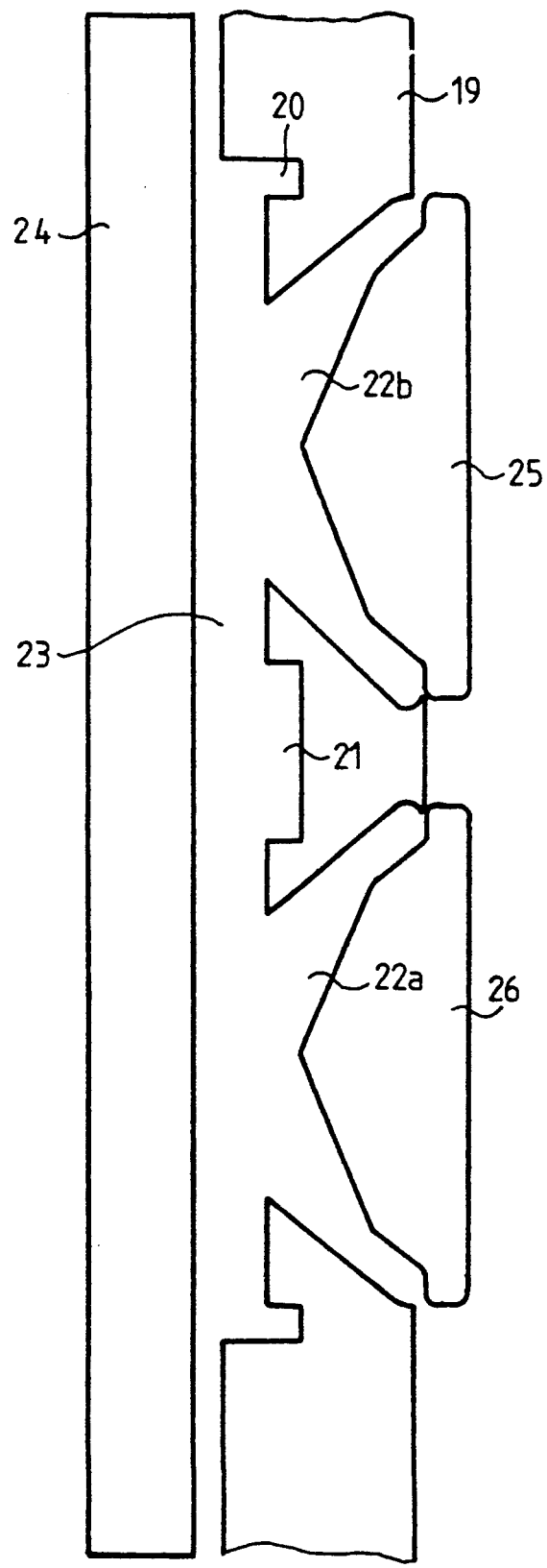

DEVICE FOR THE MARKING OF INFORMATION ELEMENTS

FIELD OF THE INVENTION

An object of the invention is a device for the forming of information elements or particulars on radiography photos or radiographs, notably mammographs. It is aimed at making it easier to recognize the origin of a mammograph that is being viewed through the superimposition, on the radiograph shown, of information elements relating, firstly, to the acquisition protocol of the photo and, secondly, to the identity of the person under examination.

DESCRIPTION OF THE PRIOR ART

There are different known types of markings of information elements on radiographs. One of the known methods consists in gaining access, through a special dark room, to the radiograph when it is being developed and in using a stylus or a special typewriter to write the information elements pertaining to the radiograph or to the person examined. This method is not very practical, firstly, because the equipment is costly and difficult to implement and, secondly, because the writing of the information elements is delayed with respect to the taking of the radiograph.

There are other known systems that consist essentially in placing indicator strips, containing the desired information elements, on the radiograph. These strips have etched information elements, the etchings being filled with lead. When the radiograph is illuminated, the etched parts mask the irradiation of the radiograph. Upon development, the desired information elements are revealed. This system using strips does resolve the problems of making the information elements removable. It is a real time system.

To keep these strips on the radiographs when the shots are being taken, there is provision for making magnetized strips. Thus, strips of this kind are arranged in a metal rack or stand, and are picked up as desired to be placed on the radiograph. However, they do not adhere properly to the radiograph because, the structures of radiography machines are increasingly being made out of non-magnetic materials, notably carbon fibers. In the end, the strips do not adhere properly to the radiographs.

There is moreover another problem to be resolved, namely that of the strip. Indeed, especially with the use of mammographs, for the examination of small breasts, during the compression of the breast, a maximum thickness of 12 mm should be achieved. It thus becomes necessary to find an affixing system that furthermore meets this constraint of maximum thickness of the indicator strips which are themselves also likely to be located partially under the compression plate.

In the invention, the problem of the positioning of the strips is resolved by providing each strip with suction cups. Given the weight of a strip and the affixing pressure that has to be obtained, it becomes necessary to make suction caps of a certain size. This size is unfortunately greater than the tolerable size in terms of height as indicated here above. This is all the more true as, in order to distinguish betwen positive and negative values of information elements, it may become necessary to place the indicator strips on either of the faces of the radiograph. In this case, they should be provided with suction caps on both sides. In the invention, the problem of thickness is resolved by the positioning, on at least one side, of a pair of suction caps instead of a single suction cap. The sum of the surface areas taken up by the affixing of each suction cap gives the surface area necessary for proper bonding. The fact of having duplicated the suction caps also means that it is possible to make suction caps that are less thick and hence to meet the constraint of thickness.

SUMMARY OF THE INVENTION

An object of the invention, therefore, is a device for the marking of information elements or particulars on radiographs, notably mammographs, comprising a set of seperate indicator strips to be taken from a convenient rack and positioned on a radiography film before the shot is taken, wherein said device comprises, placed on a lateral edge of each strip, at least two suction caps that can be detachably affixed to the radiograph, so that the thickness of the system is small.

BRIEF DESCRIPTION OF THE DRAWINGS

The invention will be understood more clearly from the following description, and from the appended figures. These figures are given purely by way of an indication and in no way restrict the scope of the invention. Of these figures:

FIGS. 1a to 1d show, respectively, a set of marking strips and a marking strip seen from the top as well as the same elements seen from the side;

FIG. 2 shows a mammography device that can be used to implement the invention;

FIGS. 3a, 3b and 3c show suction caps of the invention respectively in a detailed sectional view, a top view and a view wherein they are mounted on a strip;

FIG. 4 shows a mold for the manufacture of the suction caps.

MORE DETAILED DESCRIPTION

FIGS. 1a to 1b show a device for the marking of information elements or particulars according to the invention. This device comprises a rack 1 provided preferably at its base with a magnetic strip 2 so that it can be positioned in the vicinity of a radiograph 3 on a radiography machine (FIG. 2). The rack contains housings such as 5, each capable of receiving a strip 6 of a set of indicator strips. These indicator strips, which are generally plane shaped, essentially comprise two parts, a first part 7, in which the information elements are mentioned and a second part 8 bearing the affixing device with the suction caps 9 of the invention. A strip 6 has a slightly rectangular shape with a length of about 5 cm and a width of about 3 cm. The system of affixing by means of suction caps is placed in the vicinity of a small side of this rectangle. The particular feature of the suction cap system of the invention is that the suction caps are coupled two by two, suction cap 9a and suction cap 9b for example, the result of this being a small thickness for the affixing system.

FIG. 1d shows the strip 6 provided with an upper suction cap device 9 as well as a suction cap device of the same type 10 pointed downwards. In this way, the strips 6 may be positioned on one of their faces or on their other face on the radiograph 3 in the radiography machine 4. The radiography machine depicted shows a mammograph in which a pad 11 can be lowered in the direction of the arrow 12 to compress the breast to be radiographed at the time of the radiography. In practice, the film is not laid directly on the breast-holding tray 14 but is, on the contrary, contained in a cartridge 13 introduced into this breast-holding tray 14. The upper part of the breast-holding tray is made of a material that lets X-rays through; it is, for example, a carbon fiber material. The surface of the tray is smooth: it enables the clinging of the suction caps. However, since it is not made of metal, it would not enable the clinging of a magnetic plate.

FIG. 1b shows a strip 6 provided with its pair of suction caps 9 and 10. It can therefore be affixed to the breast-holding tray 14 on either one of its sides. Preferably, the suction caps are placed at the end because, when the suction cap is affixed, the indicator part may be slid beneath the pad 11 while the suction cap 9, which may possibly be too thick, remains in a position beyond a position that is directly perpendicular to this pad.

The invention is especially suited to use in a mammograph since, in a mammograph such as this, the breast-holding tray may be oblique or even inverted, which means that the marking device should be fixed to the machine during the irradiation.

On the small sides of the rectangle, the strips 6 have curved shapes which enable easy grasping.

FIGS. 3a and 3b respectively give a view, along a longitudinal section A—A of FIG. 3b and from the top, of the pairs of suction caps according to a special embodiment of the invention. It would thus be possible to have three or even more suction caps on one and the same side of the strip if it were necessary to further reduce the thickness. Similarly, the suction caps may be independent although, to facilitate the manufacturing process, it is preferred to obtain them in pairs. The suction caps are obtained by molding according to a technique that shall be described here below. The pairs of suction caps take the following form. The suction caps are connected to one another by a base 15, the length of which, in one example, is equal to 26 mm and has a shape of two rounded ends connected by straight segments. The rounded ends have a diameter of 13 mm. The entire periphery of the base 15 is provided with a belt 16 having an extra thickness as compared with that of the base. For example, the base has a thickness of 0.8 mm while, at the position of the belt, the thickness is 1.5 mm. This gives the set of suction caps greater resistance: this arrangement makes it possible to manufacture them and position them pair by pair on the strips. In this way, manipulation is restricted at the time of manufacture. Each suction cap, which is circular, has a round trough to enable it to be affixed to the top of the breast-holding tray 14. This affixing trough has a conical bottom, the angular aperture of which is of the order of 160°. At one-third of the height of the trough, the aperture of the cone narrows and is equal to no more than 100°. The diameters of the bonding circles of the suction caps are in the range of 10 mm: their dimensions have been given with precision in FIG. 3a. The depth of the trough is preferably 1.7 mm. If need be, the reinforcement thickness provided by the belt 16 may be further increased by positioning an extra thickness bar or padding bar 18 between the pairs of suction caps. In the example shown, the centers of the two suction caps are at a distance of 13 mm from each other.

FIG. 3c shows the pairs of suction caps 9 and 10 along a section B—B of FIG. 1b. The figure shows the same elements as in the preceding figures, but it is observed nonetheless that the padding of the extra thickness pieces 16 and 18 are pointed towards the side where the padding does not contribute to the increase in thickness of the strip once it has been positioned. Thus, this padding extends, in terms of orientation, from the base 15 towards the bonding circles of the troughs 17.

The manufacture of the suction caps is done as follows (FIG. 4). A mold is made in a plate 19, for example, an aluminium plate. The shape of the mold is the one that the suction caps should have once they are manufactured. The plate 19 thus has, on a surface, grooves 20 and 21 to enable the making of the extra thickness pieces 16 and 18 respectively. Furthermore, on another face, it has conical cavities 22a and 22b (to make the suction caps therein). To crown the cavities 22a and 22b of the belt 20 and of the extra thickness piece 21, another cavity 23 is made on the first face of the plate 19, this other cavity 23 being capable of containing the base 15 of the suction caps. The plate 19 is masked on the first face, on one side, by a closing plate 24 while the cavities 22a and 22b are plugged temporarily, during manufacture, by plugs such as 26 or 27. The plugs have a slight clearance with respect to the external diameter of the cavities 22a and 22b so as to enable a slight leakage of air or of the product to be injected at the time of injection.

The manufacturing takes place as follows. The plate 19 is placed above the plugs 25 and 26 on a table. Then, the cavities are filled with a polymerizable paste or compound. In one example, this paste is a mixture of synthetic rubber and silicone. A good paste that would be appropriate is for example, the paste RHODORSIL RTV 501 made by the firm RHONE POULENC. It is also possible to make a mixture of synthetic rubber and bonder. To bond the suction caps to their support, a bonder referenced 9732 by the firm 3M may be used. Once the cavities are filled with paste, the closing plate 24 is positioned, and the polymerization of the paste is awaited. At the time of this polymerization, the air or the polymerization gases are discharged by leaks. At the time of ejection from the mold, the plate 24 and the plugs 25 and 26 are removed, and the suction caps are drawn by the side from which the plate 24 has been removed. The suction caps come off by themselves without tearing.

What is claimed is:

1. An x-ray identification module comprising:
   a strip having at least one recess formed therein;
   an opaque x-ray marker received within the recess;
   a lateral strip portion defined adjacent the recess; and
   at least two suction cups mounted to the lateral portion, in non-overlying relationship to the marker, so as to avoid adding thickness to the strip in the area of the marker;
   the suction cups permitting releasable attachment of the device to an x-ray film plate.

2. The module set forth in claim 1 wherein the suction cups comprise:
   a base affixed to the lateral strip portion;
   a concave projection for releasable attachment to an x-ray film plate; and
   a thickened intermediate portion existing between the base and the concave projection.

3. The module set forth in claims 1 or 2 wherein a plurality of modules are linearly arranged in a rack having a magnetized base for attachment to an x-ray machine.

4. The module set forth in claims 1 or 2 wherein the suction cups exist as a pair, and further wherein a reinforced portion of the base exists along an area between the concave projections.

5. An x-ray identification module comprising:
a strip having recesses formed in opposite surfaces thereof;
an opaque x-ray marker received within one of the recesses;
a lateral strip portion defined adjacent each recess; and
at least two suction cups mounted to the lateral portion adjacent each recess, in non-overlying relationship to the marker, so as to avoid adding thickness to the strip in the area of the marker.

* * * * *